United States Patent
Ishimaru et al.

(10) Patent No.: US 9,903,669 B2
(45) Date of Patent: Feb. 27, 2018

(54) HEAT EXCHANGE ELEMENT AND AIR CONDITIONER

(75) Inventors: Yuichi Ishimaru, Chiyoda-ku (JP); Hajime Sotokawa, Chiyoda-ku (JP); Masaru Takada, Chiyoda-ku (JP); Takanori Imai, Chiyoda-ku (JP); Mitsuhiko Ohira, Chiyoda-ku (JP); Fumiaki Baba, Chiyoda-ku (JP); Yuichi Matsuo, Chiyoda-ku (JP); Shinya Tokizaki, Chiyoda-ku (JP); Koji Kise, Chiyoda-ku (JP); Masaru Shinozaki, Chiyoda-ku (JP); Tetsuo Mitani, Chiyoda-ku (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 603 days.

(21) Appl. No.: 14/385,286

(22) PCT Filed: Jun. 13, 2012

(86) PCT No.: PCT/JP2012/003840
§ 371 (c)(1),
(2), (4) Date: Sep. 15, 2014

(87) PCT Pub. No.: WO2013/157055
PCT Pub. Date: Oct. 24, 2013

(65) Prior Publication Data
US 2015/0075758 A1 Mar. 19, 2015

(30) Foreign Application Priority Data
Apr. 18, 2012 (WO) ............... PCT/JP2012/002681

(51) Int. Cl.
*F28F 7/00* (2006.01)
*F28F 9/00* (2006.01)
(Continued)

(52) U.S. Cl.
CPC ............. *F28F 9/00* (2013.01); *F28D 9/0037* (2013.01); *F28D 21/0015* (2013.01);
(Continued)

(58) Field of Classification Search
CPC ...... F28F 21/06; F28F 3/048; F28F 2275/025; F28D 9/0037; F28D 21/0015
See application file for complete search history.

(56) References Cited

U.S. PATENT DOCUMENTS 4,449,992 A * 5/1984 Yamada ............... F24F 3/147
96/7
5,775,410 A 7/1998 Ramm-Schmidt et al.
(Continued)

FOREIGN PATENT DOCUMENTS

CN 101405559 A 4/2009
CN 101641564 A 2/2010
(Continued)

OTHER PUBLICATIONS

Office Action (Notification of Reason for Refusal) dated Sep. 25, 2015, by the Korean Patent Office in corresponding Korean Patent Application No. 10-2014-7028751, and a partial English Translation of the Office Action. (9 pages).
(Continued)

*Primary Examiner* — Claire Rojohn, III
(74) *Attorney, Agent, or Firm* — Buchanan Ingersoll & Rooney PC (57) ABSTRACT

Provided is a heat exchange element that suppresses an increase in air-flow resistance by suppressing deflection of a partition member caused by a change in temperature and humidity. The unit constituent members are stacked, each of which is formed of partition members that have heat-transfer properties and moisture permeability, and spacing members that hold the partition members. A primary air flow that
(Continued)

passes along an upper-surface side of the partition member and a secondary air flow that passes along an undersurface side of the partition member cross each other so as to exchange heat and moisture via the partition member. The spacing member includes: spacing ribs that maintain the spacing between the partition members; and deflection suppressing ribs that have a height smaller than the spacing ribs so as to suppress deflection of the partition members.

17 Claims, 5 Drawing Sheets

(51) Int. Cl.
    *F28F 3/04*     (2006.01)
    *F28D 9/00*     (2006.01)
    *F28D 21/00*     (2006.01)
    *F28F 21/06*     (2006.01)
    *F24F 12/00*     (2006.01)

(52) U.S. Cl.
    CPC .............. *F28F 3/048* (2013.01); *F28F 21/06* (2013.01); *F24F 12/006* (2013.01); *F28F 2275/025* (2013.01); *Y02B 30/563* (2013.01)

(56) References Cited

U.S. PATENT DOCUMENTS

| | | | | |
|---|---|---|---|---|
| 5,851,636 A * | 12/1998 | Lang | ................... | A01K 67/027 156/290 |
| 6,071,593 A | 6/2000 | Lang et al. | | |
| 6,145,588 A * | 11/2000 | Martin | ................... | F24F 3/147 165/133 |
| 8,002,023 B2 | 8/2011 | Murayama | | |
| 8,607,851 B2 * | 12/2013 | Takada | ................... | F24F 12/006 165/166 |
| 2003/0118887 A1 * | 6/2003 | Serpico | ................ | B01D 53/268 524/261 |
| 2007/0095513 A1 * | 5/2007 | Arai | .................. | F28D 9/0062 165/166 |
| 2009/0032232 A1 * | 2/2009 | Murayama | ........... | F28D 9/0037 165/167 |
| 2012/0073791 A1 * | 3/2012 | Dubois | ............... | B01D 53/228 165/138 |
| 2014/0014289 A1 * | 1/2014 | Tan | ...................... | F28D 9/0025 165/10 |
| 2014/0262125 A1 * | 9/2014 | Erb | ...................... | F28D 9/0062 165/10 |

FOREIGN PATENT DOCUMENTS

| | | |
|---|---|---|
| DE | 102009038154 A1 | 3/2011 |
| EP | 2068107 A1 | 6/2009 |
| EP | 2 131 133 A1 | 12/2009 |
| JP | 47-19990 | 6/1972 |
| JP | 3-279793 A | 12/1991 |
| JP | 7-208891 A | 8/1995 |
| JP | 8-110076 A | 4/1996 |
| JP | 8-145588 A | 6/1996 |
| JP | 8-178577 A | 7/1996 |
| JP | 9-152291 A | 6/1997 |
| JP | 2690272 B2 | 12/1997 |
| JP | 10-506178 A | 6/1998 |
| JP | 2000-502788 A | 3/2000 |
| JP | 2003-287387 A | 10/2003 |
| JP | 2007-285691 A | 11/2007 |
| WO | WO 2007/119394 A1 | 10/2007 |
| WO | WO 2008/126372 A1 | 10/2008 |

OTHER PUBLICATIONS

Office Action dated Jun. 28, 2016, by the Chinese Patent Office in corresponding Chinese Patent Application No. 201280072417.8, and a Partial English Translation of the Office Action. (18 pages).
Office Action dated Nov. 4, 2015, by the Chinese Patent Office in corresponding Chinese Patent Application No. 201280072417.8, and an English Translation of the Office Action. (19 pages).
An Extended European Search Report dated Feb. 1, 2016 issued in corresponding European Patent Appln. No. 12874435.6 (7 pages).
International Search Report (PCT/ISA/210) dated Sep. 18, 2012, by the Japanese Patent Office as the International Searching Authority for International Application No. PCT/JP2012/003840.
Written Opinion (PCT/ISA/237) dated Sep. 18, 2012, by the Japanese Patent Office as the International Searching Authority for International Application No. PCT/JP2012/003840.
Communication Pursuant to Article 94(3) EPC dated Jan. 17, 2017, by the European Patent Office in corresponding European Patent Application No. 12 874 435.6.
Japanese Office Action dated Nov. 18, 2014 issued in corresponding Japanese Patent Appln. No. 2014-510972, with English translation (4 pages).
Taiwan Office Action dated Dec. 1, 2014 issued in corresponding Taiwan Patent Appln. No. 101126561, with English translation (8 pages).

* cited by examiner

HEAT EXCHANGE ELEMENT AND AIR CONDITIONER

FIELD

The present invention relates to a heat exchange element that has a stacked structure and exchanges heat and moisture between fluids in an air conditioner that supplies air from the outdoors to indoors and discharges air from the indoors to outdoors simultaneously.

BACKGROUND

In recent years, air conditioning devices including heaters and refrigerated air conditioners have become more advanced and widespread. As the residential areas where air conditioners are used grow, the importance of a total heat exchanger for an air conditioner, which can recover the temperature and humidity during ventilation, is increasing. The total heat exchanger as described above has a heat exchange element incorporated therein as an element component that exchanges heat. This heat exchange element can exchange latent heat and sensible heat simultaneously without mixing fresh outside air drawn from the outdoors to indoors during the use of an air conditioner with contaminated air to be discharged from the indoors to outdoors. The heat exchange element is required to have a high total heat exchange rate. Further, in order to reduce power consumption of an air blowing device (such as a fan or a blower) that circulates an air flow for ventilation, and to suppress the operating sound of the total heat exchanger to a low level, the heat exchange element is required to have a low air-flow resistance when each air flow circulates.

A conventional heat exchange element employs a structure in which partition members having gas-sealing properties, heat-transfer properties, and moisture permeability are stacked in multiple layers with a predetermined spacing, where each of the partition members is sandwiched between spacing members having a wave shape in cross section. In an example of the conventional heat exchange element, the partition member is a square flat plate, the spacing member is a wave-shaped plate formed into a triangular wave shape in cross section, and the partition members are stacked with a spacing member sandwiched therebetween in such a manner that the wave-shape direction of the alternate spacing members is turned by 90 degrees. Therefore, fluid passages in two directions, through which a primary air flow and a secondary air flow pass, are formed every two layers (Patent Literature 1). In another example of the conventional heat exchange element, a resin molded product is used as a spacing member instead of a wave-shaped plate, and a partition member and the resin molded product are integrally molded, thereby increasing the degree of flexibility in shape of the heat exchange element, improving the total heat exchange efficiency, and reducing pressure loss (Patent Literature 2).

CITATION LIST

Patent Literatures

Patent Literature 1: Japanese Patent Publication No. S47-19990

Patent Literature 2: Japanese Patent Application Laid-open No. 2003-287387

SUMMARY

Technical Problem

In the heat exchange element described in Patent Literature 1, the spacing member is wave-shaped. Therefore, there is a problem in that the effective area of an air-flow path formed between the partition members is small because of the thickness of this wave-shaped plate and further the area in which the partition member and the spacing member are in contact with each other is large; therefore, the effective area of the partition member, which is capable of heat exchange, is small, thereby decreasing the total heat exchange efficiency. Furthermore, because the spacing member is formed from paper or the like, there is a problem in that the cross-sectional shape of the air-flow path can be easily deformed, thereby increasing the air-flow resistance.

The heat exchange element described in Patent Literature 2, in which the partition member and the spacing member are integrally molded using resin, has a problem in that when the partition member expands in high-humidity environment and is then deflected, the height of a flow passage formed between the spacing members becomes non-uniform between the primary air flow side and the secondary air-flow side, and therefore the air-flow resistance is increased. This problem is particularly significant when a high-density partition member is used or when the height of the flow passage is small. This problem is a major obstacle to reducing the thickness of the material of the partition member in order to improve the total heat exchange efficiency of the heat exchange element, and to highly densifying the partition member in order to ensure the gas-sealing properties of the heat exchange element.

Therefore, in a case where the partition member and the spacing member are integrally molded using resin as described in Patent Literature 2, narrowing the arrangement spacing between the spacing members can lessen deflection of the partition member thus lessen the blocking of an air-flow path, and further can prevent increase of the air-flow resistance due to the deformation of the cross-sectional shape of the air-flow path, which instead brings down an increase in the air-flow resistance due to the decrease of the effective area of the air-flow path. Furthermore, when the arrangement spacing between the spacing members is formed narrow, increased is the area where the spacing members contact the partition members on the upper and lower layers when they are stacked. Therefore, there is a problem in that decreases in the heat-transfer area and the moisture-permeable area bring down a decrease in the total heat exchange efficiency.

The present invention has been made to solve the above problems the prior arts have, and an object of the present invention is to provide a heat exchange element that can suppress an increase in air-flow resistance by suppressing deflection of a partition member caused by a change in temperature and humidity even when a high-density material designed to improve total heat exchange efficiency is used for the partition member, and that can achieve an improvement in the total heat exchange efficiency by suppressing a decrease in heat-transfer area caused by increasing the number of spacing members.

Solution to Problem

The present invention relates to a heat exchange element that includes: unit constituent members in a stacked manner, each of which unit constituent member is constituted of partition members, each of which partition member has heat-transfer properties and moisture permeability and spacing members that hold the partition members with a predetermined spacing, in which a primary air flow passes along upper-surface sides of the partition members and a secondary air flow passes through on under-surface sides of the partition members, and in which the primary air flow and the secondary air flow cross and exchange heat and moisture via the partition members, wherein the spacing member includes first spacing ribs that are provided on the upper surface of the partition member with a predetermined spacing parallel to a direction of the primary air flow, second spacing ribs that are provided on the undersurface of the partition member with a predetermined spacing parallel to a direction of the secondary air flow, first deflection-suppressing ribs that are connected to the second spacing ribs, that are provided between the first spacing ribs parallel to each other with a predetermined spacing, and that have a height smaller than the first spacing ribs, and second deflection-suppressing ribs that are connected to the first spacing ribs, that are provided between the second spacing ribs parallel to each other with a predetermined spacing, and that have a height smaller than the second spacing ribs.

Advantageous Effects of Invention

In the heat exchange element of the present invention, deflection suppressing ribs that are separate from the spacing ribs are formed between the spacing ribs on the partition member. Therefore, the heat exchange element of the present invention can suppress blockage of an air-flow path even when the partition member expands/contracts due to changes in environmental temperature and humidity, and can suppress an increase in pressure loss. The deflection suppressing ribs have a height sufficiently smaller than the spacing ribs, and therefore do not contact other layers (the upper and lower layers when they are stacked). Accordingly, the deflection suppressing ribs result in a small decrease in the heat-transfer area and the moisture-permeable area in each layer of the partition member. Consequently, the moisture exchange efficiency and the total heat exchange efficiency can be improved.

DESCRIPTION OF EMBODIMENTS

First Embodiment

Figure 1:
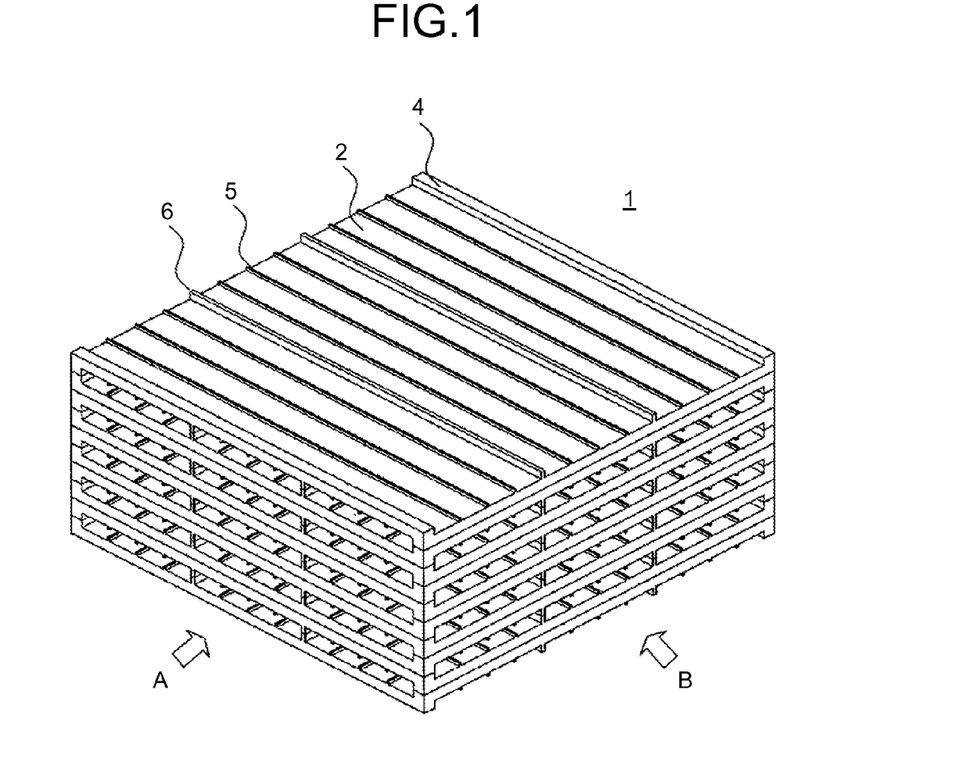
FIG. 1 is a perspective view of a heat exchange element according to a first embodiment of the present invention.
Figure 2:
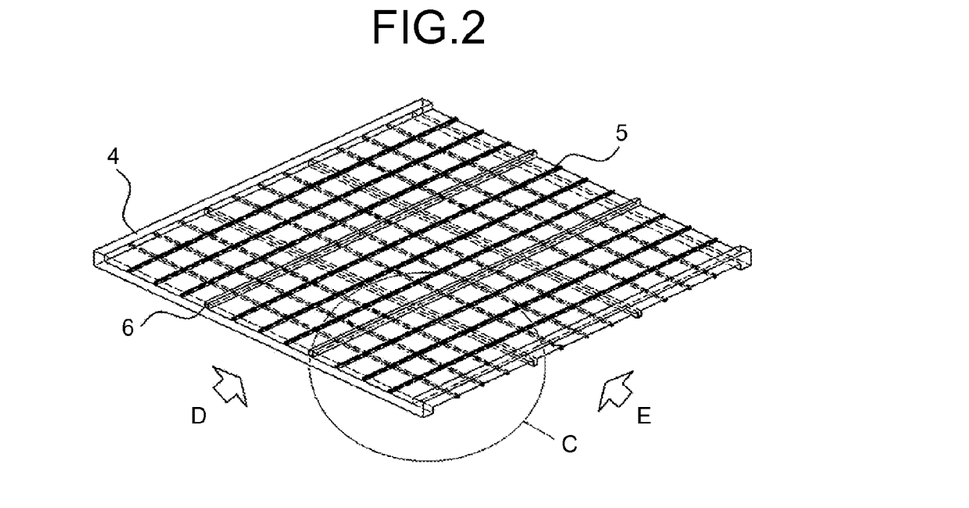
FIG. 2 is a perspective view of one layer of a unit constituent member according to the first embodiment of the present invention.
Figure 3:
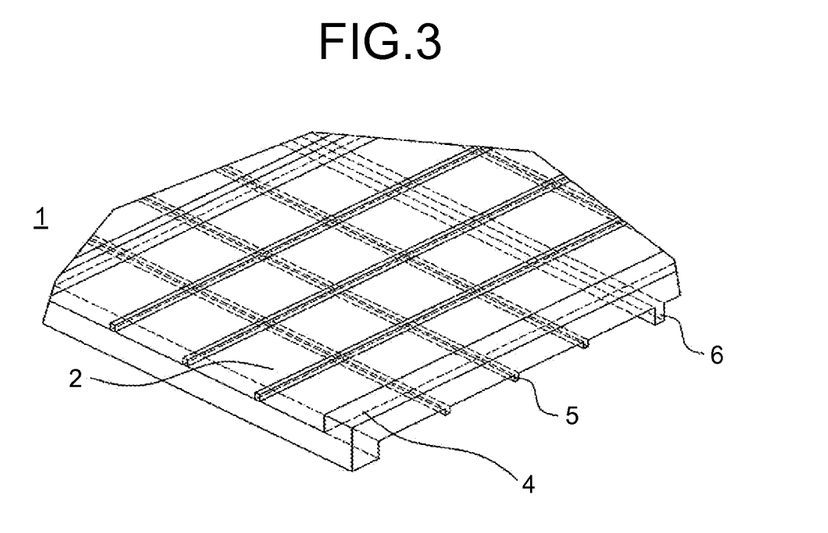
FIG. 3 is an enlarged view of a C part of the one layer of the unit constituent member according to the first embodiment of the present invention in FIG. 2.

A first embodiment of the present invention is explained below with reference to the accompanying drawings. FIG. 1 is a perspective view of a heat exchange element according to the first embodiment of the present invention. FIG. 2 is a perspective view of one layer of a unit constituent member according to the first embodiment of the present invention. FIG. 3 is an enlarged view of a C part of the one layer of the unit constituent member according to the first embodiment of the present invention in FIG. 2.

As shown in FIGS. 1 and 2, a heat exchange element 1 according to the first embodiment of the present invention is formed by stacking unit constituent members 7 that are alternately turned by 90 degrees. Each of the unit constituent members 7 is formed by molding a partition member 2 that performs heat exchange of the air passing through upside and downside of the partition member 2, having heat-transfer properties, moisture permeability, and sealing properties, integrally with a spacing member 3 that holds the partition member 2 with a predetermined spacing. In the heat exchange element 1, a primary air flow A that passes along side of the partition member 2 and a secondary air flow B that passes through the other side of the partition member 2 exchange heat and moisture through the partition member 2.

Each constituent element of the heat exchange element 1 is explained below in detail.

The partition member 2 serves as a medium through which heat and moisture pass when heat and moisture are exchange between the primary air flow A and the secondary air flow B. When the primary air flow A and the secondary air flow B occur, a heat (or water vapor) temperature difference (or a water-vapor partial-pressure difference) in a higher-temperature-side (or higher-humidity-side) air flow is utilized on both surfaces of the partition member 2 to move the heat and moisture from the higher-temperature side (the higher-humidity side) to the lower-temperature side (or the lower-humidity side) through the partition member 2, thereby exchanging the temperature (humidity). At the same time, the partition member 2 is required to prevent the primary air flow A from being mixed with the secondary air flow B, and to be able to suppress movement of carbon dioxide, odor, and other components between the primary air flow A and the secondary air flow B. In order to satisfy these requirements, the partition member 2 has a high density, and preferably has a density of 0.95 [$g/cm^3$] or higher, an air permeability resistance (JIS•P8628) of 5,000 seconds/100 cc or higher, and moisture permeability. Specifically, the raw material of the partition member 2 can be a Japanese paper, a fire-proof paper in which inorganic additives are mixed, other papers such as a specially-processed paper having undergone special processing, or a paper made from a mixture of resin and pulp. The material of the partition member 2 can be a porous sheet (such as a nonwoven fabric or an expanded PTFE film) bonded with heat, an adhesive, or the like, to a moisture-permeable film having undergone chemical treatment to provide the functionality such as moisture permeability and flame retardancy, or to a water-insoluble hydrophilic polymer thin film formed of resin that has moisture permeability, such as polyurethane-based resin that includes an oxyethylene group, polyester-based resin that includes an oxyethylene group, or resin that includes a sulfonic acid group, an amino group, a hydroxyl group, or a carboxyl group at the terminal or side chain. Also, in a case of a sensible heat exchanger, the material of the partition member 2 can be a resin sheet or resin film of polystyrene-based ABS, AS, or PS resin, or of polyolefin-based PP or PE resin, or other materials that only have heat-transfer properties and gas-sealing properties.

In order to improve the heat-transfer properties, moisture permeability, and gas-sealing properties, cellulose fibers (pulp) are fibrillated by sufficiently beating, and after making a paper by using the fibrillated fibers, calendering (pressing) is performed on the paper by a super calender or the like, thereby obtaining a high-density specially-processed paper. The partition member 2 formed from these high-density specially-processed papers, unless additives such as an inorganic substance are mixed in, has a thickness of approximately 20 to 60 μm, and a density of 0.9 g/cm$^3$ or higher extremely close to 1 g/cm$^3$, and can be even further higher in some cases, as compared with normal papers (a thickness of approximately 100 to 150 μm and a density of approximately 0.6 to 0.8 g/cm$^3$). In terms of the gas-sealing properties, conventionally, polyvinyl alcohol that serves as a filler is applied to a porous paper in order to increase the air permeability resistance. However, the partition member 2 is highly densified as described above, its holes are filled with the cellulose fibers themselves at a high density, and therefore the air permeability resistance of approximately 5,000 seconds/100 cc is ensured without adding such special processing as described above.

Figure 4:
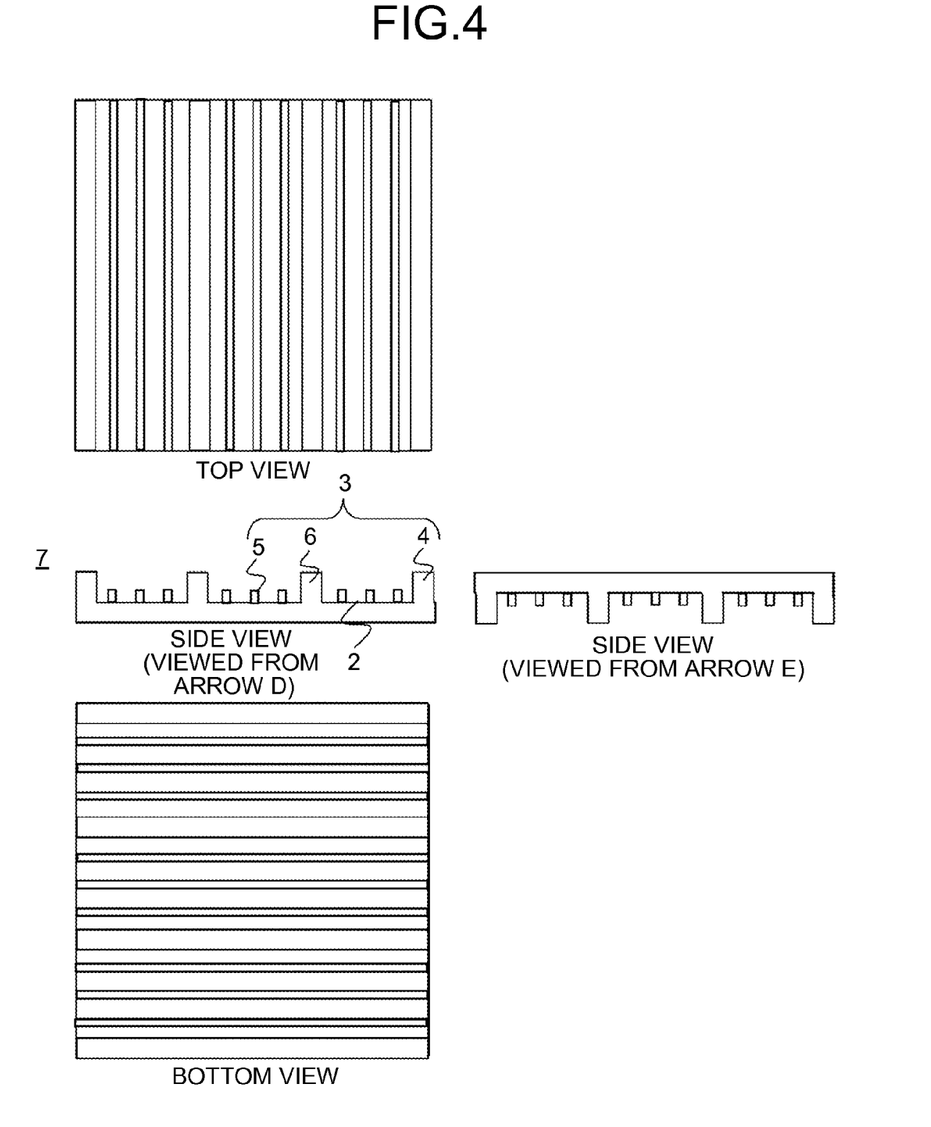
FIG. 4 are schematic diagrams of four sides of the one layer of the unit constituent member according to the first embodiment of the present invention.

Next, the spacing member 3 is explained with reference to FIG. 4. FIG. 4 are schematic diagrams of four sides of the one layer of the unit constituent member 7 according to the first embodiment of the present invention.

As shown in FIG. 4, the spacing member 3 suppresses deflection of the partition member 2 caused by its expansion, and constitutes a part other than the partition member 2 in the heat exchange element 1. Specifically, the spacing member 3 constitutes the outer frame of the heat exchange element 1, and is configured by: sealing ribs 4 that are provided on both ends of the heat exchange element 1 parallel to an air-flow direction in order to prevent air leakage from the both ends; a plurality of spacing ribs 6 that are provided with a predetermined spacing parallel to the sealing ribs 4, and that hold the spacing between the partition members 2 in a stacked direction, in which the heat exchange element 1 is stacked, to form an air-flow path; and a plurality of deflection suppressing ribs 5, provided between the spacing ribs 6, which are adjacent to each other and parallel to the spacing ribs 6 with a predetermined spacing, and that suppress deflection of the partition member 2 and therefore suppress blockage of an air-flow path. The deflection suppressing rib 5 is formed with a smaller height and a smaller width than those of the spacing member 6. The sealing rib 4, the deflection suppressing rib 5, and the spacing rib 6 are formed on both the upper surface and the under surface of the partition member 2 in such a manner that those formed on the upper surface are rotated by 90 degrees relative to those formed on the undersurface. Note that it is desirable for the deflection suppressing rib 5 to have a thin and narrow shape so as to minimize pressure loss of ventilating air and so as not to decrease the heat-transfer area and the moisture-permeable area of the partition member 2. Therefore, it is desirable for the deflection suppressing rib 5 to have a small rib height and a small rib width. Specifically, it is desirable that the rib height of the deflection suppressing rib 5 is smaller than half the rib height of the spacing rib 6, so as not to interfere with (contact) the deflection suppressing ribs 5 on the upper and lower layers when they are stacked. Further, because the width of the deflection suppressing rib 5 can be a cause of decreasing the heat-transfer area and the moisture-permeable area, it is desirable to form the deflection suppressing rib 5 as thin as possible during the molding.

A specific configuration of the heat exchange element 1, configured by the alternate rotation of 90 degrees, is explained below with reference to FIGS. 5 to 7.

Figure 5:
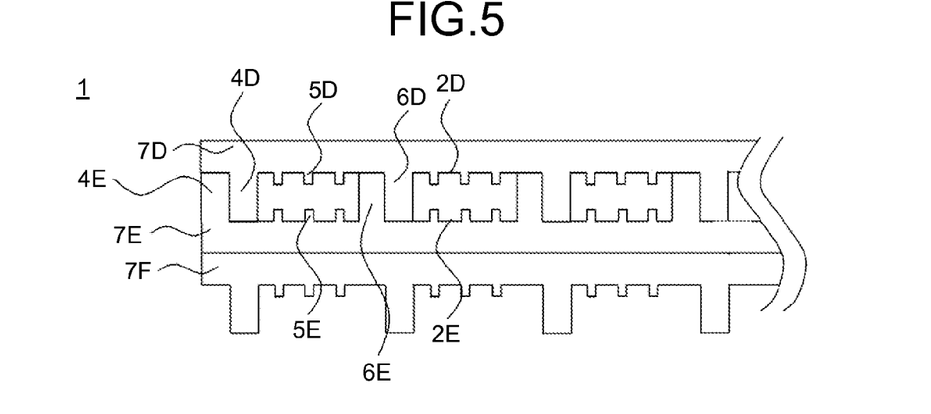
FIG. 5 is a schematic diagram of the unit constituent members that are stacked and that have a configuration in which the spacing ribs according to the first embodiment of the present invention do not come into contact with each other at their distal ends when the unit constituent members are stacked.

FIG. 5 is a schematic diagram of the unit constituent members 7 that are stacked and that have a configuration in which the spacing ribs 6 according to the first embodiment do not come into contact with each other at their distal ends when stacked.

The heat exchange element 1 shown in FIG. 5 (focusing only on three layers) is configured by stacking the unit constituent members 7 having the same structure (those located on the top, the middle, and the bottom are designated as 7D, 7E, and 7F in the described order). A sealing rib 4D of the top unit constituent member 7D and a sealing rib 4E of the middle unit constituent member 7E come into contact with each other on their side surfaces. Further, the end surface of the sealing rib 4D of the top unit constituent member 7D comes into contact with a partition member 2E of the middle unit constituent member 7E. Also, the end surface of the sealing rib 4E of the middle unit constituent member 7E comes into contact with a partition member 2D of the top unit constituent member 7D. Similarly, a spacing rib 6D of the top unit constituent member 7D and a spacing rib 6E of the middle unit constituent member 7E come into contact with each other on their side surfaces. Furthermore, the end surface of the spacing rib 6D of the top unit constituent member 7D comes into contact with the partition member 2E of the middle unit constituent member 7E. Also, the end surface of the spacing rib 6E of the middle unit constituent member 7E comes into contact with the partition member 2D of the top unit constituent member 7D. A space surrounded by the sealing ribs 4D and 4E, the spacing ribs 6D and 6E, and the spacing ribs 6D and 6E serves as an air-flow path. Within this air-flow path, deflection suppressing ribs 5D and 5E are provided to suppress deflection of the partition members 2D and 2E. In FIG. 5, the deflection suppressing rib 5D of the top unit constituent member 7D is located immediately above the deflection suppressing rib 5E of the middle unit constituent member 7E. However, the deflection suppressing rib 5D can be displaced from the immediately-above position. The sealing ribs 4D and 4E also have a function as the spacing ribs 6D and 6E that hold the spacing between the partition members 2D and 2E in the stacked direction in which the unit constituent members 7D and 7E are stacked. Further, the unit constituent members 7 can have a structure in which the sealing ribs 4D and 4E are not provided, but only the spacing ribs 6D and 6E and the deflection suppressing ribs 5D and 5E are provided, and a sealing material or the like is used between the spacing ribs 6D and 6E on both ends to maintain the air-sealing properties. In FIG. 5, the spacing rib 6D and the spacing rib 6E come into contact with each other on their side surfaces. However, apparently the spacing rib 6D and the spacing rib 6E do not necessarily come into contact with each other on their side surfaces.

The deflection suppressing ribs 5D and 5E have a much small width, and therefore result in a small decrease in the heat-transfer area and the moisture-permeable area in each layer of the partition members 2D and 2E. Consequently, the moisture exchange efficiency and the total heat exchange efficiency can be improved. Further, the deflection suppressing ribs 5D and 5E can simultaneously serve as a fin, and thus the fin bring about an effect of improving the temperature exchange efficiency.

The deflection suppressing ribs 5D and 5E are configured to cross each other at a right angle on the upper side and the underside of each of the partition members 2D and 2E. This configuration reduces the expansion amount of the partition members 2D and 2E surrounded by the deflection suppressing ribs 5 in both the paper-width direction and the paper-length direction. This configuration also reduces the deflection rate in the region of the partition members 2D and 2E held by the deflection suppressing ribs 5D and 5E, and therefore suppresses pressure loss caused by an increase in the air-flow resistance. Further, the heat exchange element 1 can be formed by integral molding using a material that cannot conventionally be used for the partition members 2D and 2E due to its large expansion/contraction amount, and therefore its bonding difficulty and large degree of deflection.

Figure 6:
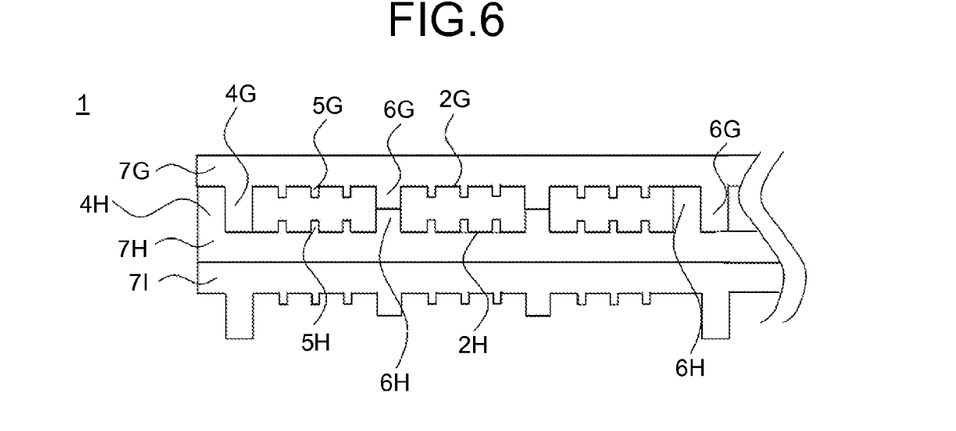
FIG. 6 is a schematic diagram of the unit constituent members that are stacked and that have a configuration in which some of the spacing ribs according to the first embodiment of the present invention come into contact with each other at their distal ends when the unit constituent members are stacked.

FIG. 6 is a schematic diagram of the unit constituent members 7 that are stacked and that have a configuration in which some of the spacing ribs 6 according to the first embodiment of the present invention come into contact with each other at their distal ends when the unit constituent members 7 are stacked.

The heat exchange element 1 shown in FIG. 6 (focusing only on three layers) is configured by stacking the unit constituent members 7 having the same structure (those located on the top, the middle, and the bottom are designated as 7G, 7H, and 7I in the described order). A sealing rib 4G of the top unit constituent member 7G and a sealing rib 4H of the middle unit constituent member 7H come into contact with each other on their side surfaces. Further, the end surface of the sealing rib 4G of the top unit constituent member 7G comes into contact with a partition member 2H of the middle unit constituent member 7H. Also, the end surface of the sealing rib 4H of the middle unit constituent member 7H comes into contact with a partition member 2G of the top unit constituent member 7G. In FIG. 5, the spacing rib 6D of the top unit constituent member 7D and the spacing rib 6E of the middle unit constituent member 7E come into contact with each other on their side surfaces, the end surface of the spacing rib 6D of the top unit constituent member 7D comes into contact with the partition member 2E of the middle unit constituent member 7E, and the end surface of the spacing rib 6E of the middle unit constituent member 7E comes into contact with the partition member 2D of the top unit constituent member 7D. However, in FIG. 6, not all spacing ribs 6G and 6H have this structure, and some of the spacing ribs 6G and 6H come into contact with each other at their distal ends. A space surrounded by the sealing ribs 4G and 4H, the spacing ribs 6G and 6H, and the spacing ribs 6G and 6H serves as an air-flow path. Within this air-flow path, deflection suppressing ribs 5G and 5H are provided to suppress deflection of the partition members 2G and 2H. In FIG. 6, the deflection suppressing rib 5G of the top unit constituent member 7G is located immediately above the deflection suppressing rib 5H of the middle unit constituent member 7H. However, the deflection suppressing rib 5G can be displaced from the immediately-above position. Note that the sealing ribs 4G and 4H also have a function as the spacing ribs 6G and 6H that hold the spacing between the partition members 2G and 2H in the stacked direction in which the unit constituent members 7G and 7H are stacked. The unit constituent members 7 can have a structure in which the sealing ribs 4G and 4H are not provided, but only the spacing ribs 6G and 6H and the deflection suppressing ribs 5G and 5H are provided, and a sealing material or the like is used between the spacing ribs 6G and 6H on both ends to maintain the air-sealing properties. In FIG. 6, the spacing rib 6G and the spacing rib 6H come into contact with each other on their side surfaces. However, apparently the spacing rib 6G and the spacing rib 6H do not necessarily come into contact with each other on their side surfaces.

The deflection suppressing ribs 5G and 5H have a much small width, which therefore brings about a small decrease in the heat-transfer area and the moisture-permeable area in each layer of the partition members 2G and 2H. Consequently, the moisture exchange efficiency and the total heat exchange efficiency can be improved. Further, the deflection suppressing ribs 5G and 5H can simultaneously serve as a fin, and thus the fin produces an effect of improving the temperature exchange efficiency.

The deflection suppressing ribs 5G and 5H are configured to cross each other at a right angle on the upper side and the underside of each of the partition members 2G and 2H, of which configuration reduces the expansion amount of the partition members 2G and 2H surrounded by the deflection suppressing ribs 5G and 5H in both the paper-width direction and the paper-length direction and of which configuration also reduces the deflection rate in the region of the partition members 2G and 2H held by the deflection suppressing ribs 5G and 5H, and therefore suppresses pressure loss caused by an increase in the air-flow resistance. Further, because some of the spacing ribs 6G and 6H come into contact with each other at their distal ends, it is possible to ensure a larger air-flow path area than the case where all the spacing ribs 6G and 6H come into contact with each other on their side surfaces, so that pressure loss caused by an increase in the air-flow resistance can be suppressed. Furthermore, the heat exchange element 1 can be formed by integral molding using a material that cannot conventionally be used for the partition members 2D and 2E due to its large expansion/contraction amount and due to its bonding difficulty and large degree of deflection.

Figure 7:
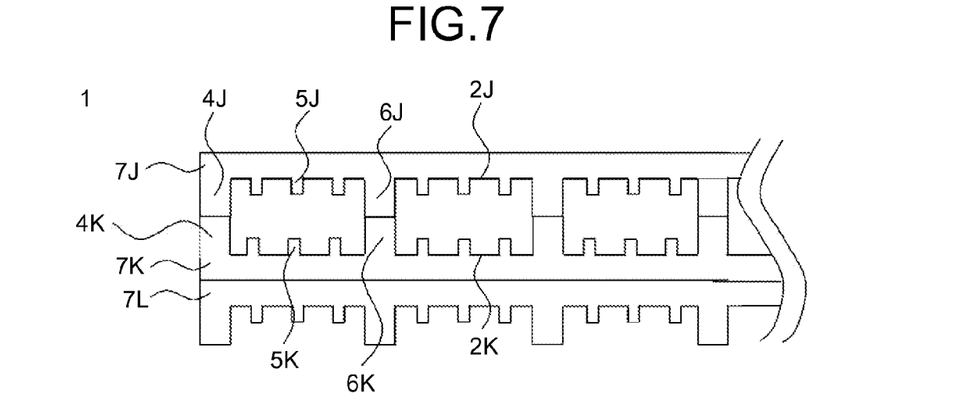
FIG. 7 is a schematic diagram of the unit constituent members that are stacked and that have a configuration in which all the spacing ribs according to the first embodiment of the present invention come into contact with each other at their distal ends when the unit constituent members are stacked.

FIG. 7 is a schematic diagram of the unit constituent members 7 that are stacked and that have a configuration in which all the spacing ribs 6 according to the first embodiment of the present invention come into contact with each other at their distal ends when the unit constituent members 7 are stacked.

The heat exchange element 1 shown in FIG. 7 (focusing only on three layers) is configured by stacking the unit constituent members 7 having the same structure (those located on the top, the middle, and the bottom are designated as 7J, 7K, and 7L in the described order).

A sealing rib 4J of the top unit constituent member 7J and a sealing rib 4K of the middle unit constituent member 7K come into contact with each other at their end surfaces; and a spacing rib 6J of the top unit constituent member 7J and a spacing rib 6K of the middle unit constituent member 7K come into contact with each other at their end surfaces. A space surrounded by the sealing ribs 4J and 4K, the spacing ribs 6J and 6K, and the spacing ribs 6J and 6K serves as an air-flow path. Within this air-flow path, deflection suppressing ribs 5J and 5K are provided to suppress deflection of partition members 2J and 2K. In FIG. 7, the deflection suppressing rib 5J of the top unit constituent member 7J is located immediately above the deflection suppressing rib 5K of the middle unit constituent member 7K. However, the deflection suppressing rib 5J can be displaced from the immediately-above position. The sealing ribs 4J and 4K also have a function as the spacing ribs 6G and 6H that hold the spacing between the partition members 2J and 2K in the stacked direction in which the unit constituent members 7J and 7K are stacked. Further, the unit constituent members 7 can have a structure in which the sealing ribs 4J and 4K are not provided, only the spacing ribs 6G and 6H and the deflection suppressing ribs 5J and 5K are provided, and a sealing material or the like is used between the spacing ribs 6G and 6H on both ends to maintain the air-sealing properties.

The deflection suppressing ribs 5J and 5K have a much small width, which results in a small decrease in the heat-transfer area and the moisture-permeable area in each layer of the partition members 2J and 2K, so that consequently the moisture exchange efficiency and the total heat exchange efficiency can be improved. Further, the deflection suppressing ribs 5J and 5K can simultaneously serve as a fin, which brings about a fin effect of improving the temperature exchange efficiency.

The deflection suppressing ribs 5J and 5K are configured to cross each other at a right angle on the upper side and the underside of each of the partition members 2J and 2K, of which configuration reduces the expansion amount of the partition members 2J and 2K surrounded by the deflection suppressing ribs 5J and 5K in both the paper-width direction and the paper-length direction and of which configuration also reduces the deflection rate in the region of the partition members 2J and 2K held by the deflection suppressing ribs 5J and 5K, and therefore suppresses pressure loss caused by an increase in the air-flow resistance. Further, because all the spacing ribs 6J and 6K come into contact with each other at their distal ends, it is possible to ensure a larger air-flow path area as compared to the case where the spacing ribs 6J and 6K come into contact with each other on their side surfaces. Therefore, pressure loss caused by an increase in the air-flow resistance can be suppressed. Furthermore, because the sealing ribs 4J and 4K come into contact with each other at their distal ends, one side that constitutes the air-flow path is twice, which makes it possible to ensure a significantly larger air-flow path area and which therefore makes it possible to suppress pressure loss caused by an increase in the air-flow resistance. Further, the heat exchange element 1 can be formed by integral molding using a material that cannot conventionally be used for the partition members 2J and 2K due to its large expansion/contraction amount and due to its bonding difficulty and large degree of deflection.

If a large number of the deflection suppressing ribs 5 are provided for the purpose of suppressing deflection of the partition member 2, deflection of the partition member 2 can be adequately suppressed and at the same time, the occupation ratio of the deflection suppressing ribs 5 in an air-flow path becomes high so that thus the air-flow resistance is increased. On the other hand, if only a small number of the deflection suppressing ribs 5 are provided, the occupation ratio of the deflection suppressing ribs 5 in an air-flow path can become low, but at the same time, the partition member 2 is deflected to a large extent, so that thus the air-flow resistance is increased. Therefore, in order to suppress the air-flow resistance low level, it is necessary to study the arrangement spacing between the partition members 2.

Figure 8:
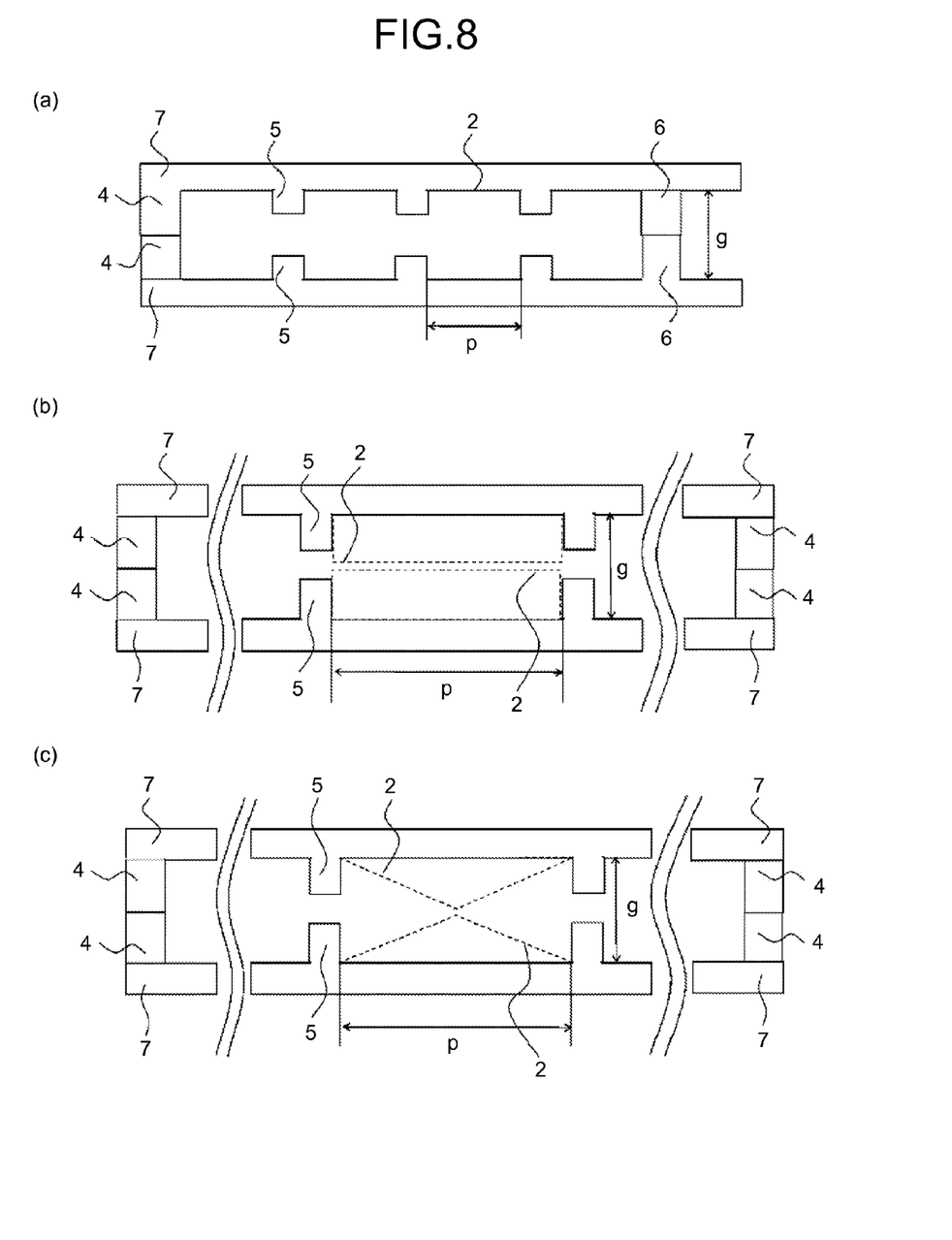
FIG. 8 are explanatory diagrams of an arrangement spacing between deflection suppressing ribs in the heat exchange element according to the first embodiment of the present invention.

FIG. 8 are explanatory diagrams of an arrangement spacing between deflection suppressing ribs in the heat exchange element according to the first embodiment of the present invention.

FIG. 8(a) shows one air-flow path surrounded by the spacing ribs 6 and the sealing ribs 4. The height of an air-flow path is represented as g [mm], the arrangement spacing between deflection suppressing ribs is represented as p [mm], and the rate of change in dimension of a partition member at the time of its expansion is represented as σ. The rate of change in dimension σ is determined by dividing the length of the expanded portion of the partition member by the reference length of the partition member before the expansion. The dimension of the expanded portion of a partition member is defined as a dimension of an expanded portion of the partition member that has completely expanded after having been left in environmental conditions at the relative humidity of as close to 100% RH as possible for a sufficient time lapse.

With reference to FIG. 8(b), a condition in which partition members completely block an air-flow path is explained.

The temperature and humidity of air that flows along air-flow path can be considered to be substantially the same. Therefore, the partition members 2 that respectively constitute the upper surface and the lower surface of the air-flow path can be considered to expand by the same amount at their opposing position. Accordingly, given that each of the partition members 2 that respectively constitute the upper surface and the lower surface blocks half of an air-flow path, one air-flow path is thus totally blocked. A condition in which the partition member 2 on the upper surface or the lower surface blocks half of the air-flow path in this manner is described below.

The length of the partition member 2 on the upper surface or the lower surface of one air-flow path after the partition member 2 has sufficiently expanded is represented as $p(1+σ)$. The required length for the partition member 2 to block half of the air-flow path is represented as $p+2(g/2)$. Therefore, the following relation holds.

$$p(1+σ)=p+2(g/2) \quad \text{(Equation 1)}$$

That is, when the following relation is satisfied, the partition members 2 completely block the air-flow path.

$$p=g/σ \quad \text{(Equation 2)}$$

Therefore, in order for the partition members 2 not to completely block the air-flow path, it is necessary to satisfy the following relation.

$$p<g/σ \quad \text{(Equation 3)}$$

By arranging the deflection suppressing ribs 5 so as to satisfy the above requirement (Equation 3), the situation where the partition members 2 completely block the air-flow path can be prevented.

Although the partition members 2 that respectively constitute the upper and lower surfaces of the air-flow path do not completely block the air-flow path, when the partition members 2 adhere to each other, there are problems in that the surface coating comes off, and upon the environmental changes, the partition members 2 return to their original length at a slower speed. Therefore, it is desirable to arrange the deflection suppressing ribs 5 in such a manner that the partition members 2 that respectively constitute the upper and lower surfaces of an air-flow path do not adhere to each other.

With reference to FIG. 8(c), a condition in which the partition members 2 start contacting each other is explained below.

The partition member 2 is deflected mostly at the halfway point between the deflection suppressing ribs 5, which is the maximum-distance position from the deflection suppressing ribs 5. Therefore, when this halfway point reaches the halfway point of the height g [mm] of an air-flow path, there is a possibility of the partition members 2 to start contacting each other. The length of the partition member 2 on the upper surface or the lower surface of one air-flow path after the partition member 2 has sufficiently expanded is represented as p(1+σ). Therefore, the following relation holds.

$$g/2 = \sqrt{\left(\frac{(1+\sigma)p}{2}\right)^2 - \left(\frac{p}{2}\right)^2} \quad \text{(Equation 4)}$$

That is, when the following relation is satisfied, the partition members 2 that respectively constitute the upper and lower surfaces of an air-flow path start contacting each other.

$$p = \frac{g}{\sqrt{\sigma(\sigma+2)}} \quad \text{(Equation 5)}$$

Therefore, in order for the partition members 2 not to contact each other, it is necessary to satisfy the following relation.

$$p < \frac{g}{\sqrt{\sigma(\sigma+2)}} \quad \text{(Equation 6)}$$

As shown in (Equation 3) and (Equation 6), the arrangement spacing between the deflection suppressing ribs is proportional to the height g of an air-flow path, and is inversely proportional to the rate of change in dimension σ. Therefore, in a case where the height of the air-flow path is large, the arrangement spacing can be increased. In a case of using a partition member with a high rate of change in dimension, it is necessary to reduce the arrangement spacing.

The spacing member 3 that is configured by the sealing rib 4, the deflection suppressing rib 5, and the spacing rib 6 has a substantially square shape (when a primary air flow and a secondary air flow cross each other at a right angle) or a parallelogram shape (when the primary air flow and the secondary air flow cross each other at an oblique angle). In order for the partition member 2 to increase its reliability of preventing air leakage, generally the width of the sealing rib 4 needs to be set greater than the width of the spacing rib 6. However, when the occupation area of the spacing ribs 6 on the partition member 2 is increased, the heat-transfer area and the moisture-permeable area of the partition member 2 decrease, it is desirable that the width of the spacing rib 6 is as small as possible. With the small rib width, the amount of resin used can also be reduced. The resin used for the spacing member 3 can be polypropylene (PP) resin, acrylonitrile-butadiene-styrene (ABS) resin, polystyrene (PS) resin, acrylonitrile-styrene (AS) resin, polycarbonate (PC) resin, or other commonly used resins capable of being molded into a desired shape. By molding ribs using resin as described above, deformation of such spacing member 3 shown in FIG. 1 as corrugated shape caused by a change in humidity can be suppressed, and therefore an air-flow path can be stably maintained. Further, these resins are made flame-retardant by adding flame retardants, or made stable in dimensional change and strengthened by adding inorganic substances.

Note that an air conditioner with high total heat exchange efficiency and a low air-flow resistance can be obtained by providing the heat exchange element 1 described above at a location where the primary air flow A and the secondary air flow B cross each other.

REFERENCE SIGNS LIST 1 heat exchange element
2•2D•2E•2G•2H•2J•2K partition member
3 spacing member
4•4D•4E•4G•4H•4J•4K sealing rib
5•5D•5E•5G•5H•5J•5K deflection suppressing rib
6•6D•6E•6G•6H•6J•6K spacing rib
7•7D•7E•7F•7G•7H•7I•7J•7K•7L unit constituent member
A primary air flow
B secondary air flow

The invention claimed is:

1. A heat exchange element, comprising:
unit constituent members arranged in a stacked manner, each unit constituent member is constituted of partition members, each partition member has heat-transfer properties and moisture permeability and spacing members that hold the partition members with a predetermined spacing, wherein the unit constituent members are configured so that
a primary air flow passes along upper-surface sides of the partition members and a secondary air flow passes through on under-surface sides of the partition members, and the primary air flow and the secondary air flow cross and exchange heat and moisture via the partition members, wherein
the spacing member comprises:
first spacing ribs provided on the upper surface of the partition member with a predetermined spacing parallel to a direction of the primary air flow;
second spacing ribs provided on the undersurface of the partition member with a predetermined spacing parallel to a direction of the secondary air flow;
first deflection-suppressing ribs connected to the second spacing ribs, the first deflection-suppressing ribs provided on the upper surface of the partition member between the first spacing ribs, the first deflection-suppressing ribs being parallel to the first spacing ribs with a predetermined spacing, and have a height smaller than the first spacing ribs; and
second deflection-suppressing ribs connected to the first spacing ribs, the second deflection-suppressing ribs provided on the undersurface of the partition member between the second spacing ribs, the second deflection-suppressing ribs being parallel to the second spacing ribs with a predetermined spacing, and have a height smaller than the second spacing ribs.

2. The heat exchange element according to claim 1, further comprising:
first sealing ribs provided on both sides of the upper surface of the partition member, being parallel to the direction of the primary air flow; and
second sealing ribs provided on both sides of the undersurface of the partition member, being parallel to the direction of the secondary air flow, wherein the first spacing ribs are connected to the second sealing ribs, provided between the first sealing ribs, and parallel to the first sealing ribs with a predetermined spacing, the second spacing ribs are connected to the first sealing ribs, provided between the second sealing ribs, and parallel to the second sealing ribs with a predetermined spacing, the first deflection-suppressing ribs are connected to the second sealing ribs and provided between the first spacing ribs and parallel to the first spacing ribs with a predetermined spacing, and the second deflection-suppressing ribs are connected to the first sealing ribs and provided between the second spacing ribs and parallel to the second spacing ribs with a predetermined spacing.

3. The heat exchange element according to claim 1, wherein a width of the first and second deflection-suppressing ribs is smaller than a width of the first and second spacing ribs.

4. The heat exchange element according to claim 1, wherein the unit constituent member has a rectangular shape, and each of the first and second spacing ribs and each of the first and second deflection-suppressing ribs are formed into a continuous line that extends from one side of the unit constituent member to another opposite side.

5. The heat exchange element according to claim 1, wherein the unit constituent member has a square shape, the spacing ribs and the deflection suppressing ribs are provided on both surfaces of the partition member, the first and second spacing ribs are provided respectively on the upper surface of the partition member and on the undersurface of the partition member with a same pitch, and the first and second spacing ribs are provided as being rotated by 90 degrees relative to each other.

6. The heat exchange element according to claim 1, wherein the unit constituent members are stacked alternately rotated by 90 degrees.

7. The heat exchange element according to claim 1, wherein the partition members and the spacing members of the unit constituent member are integrally molded.

8. The heat exchange element according to claim 1, wherein the spacing member is formed of resin.

9. The heat exchange element according to claim 1, wherein in the heat exchange element in which the unit constituent members are stacked, distal ends of the first and second spacing ribs formed on one of the unit constituent members come into contact respectively with other partition members formed on another of the unit constituent members.

10. The heat exchange element according to claim 1, wherein in the heat exchange element in which the unit constituent members are stacked, distal ends of the first and second spacing ribs, each of which is formed on one of the unit constituent members, come into contact with corresponding distal ends of the first and second spacing ribs, each of which is formed on the other of the unit constituent members.

11. The heat exchange element according to claim 1, wherein in the heat exchange element in which the unit constituent members are stacked, distal ends of some of the first and second spacing ribs formed on one of the unit constituent members come into contact respectively with the partition members formed on the other of the unit constituent members stacked, and distal ends of some of the first and second spacing ribs formed on the other of the unit constituent members come into contact respectively with the partition members formed on one of the unit constituent members stacked.

12. The heat exchange element according to claim 1, wherein a height of the first and second deflection-suppressing ribs is smaller than half a height of the first and second spacing ribs.

13. The heat exchange element according to claim 1, wherein an air permeability resistance of the partition member is equal to or higher than 5,000 seconds/100 cc.

14. The heat exchange element according to claim 1, wherein when a height of an air-flow path formed by stacking the unit constituent members is represented as g, a rate of change in dimension determined by dividing a length of an expanded portion of the partition member when it has expanded by its reference dimension before the expansion is represented as a, and an arrangement spacing between the deflection suppressing ribs is represented as p, the arrangement spacing p satisfies a relation expressed as $$p < g/\sigma.$$

15. The heat exchange element according to claim 1, wherein when a height of an air-flow path formed by stacking the unit constituent members is represented as g, a rate of change in dimension determined by dividing a length of an expanded portion of the partition member when it has expanded by its reference dimension before the expansion is represented as a, and an arrangement spacing between the deflection suppressing ribs is represented as p, the arrangement spacing p satisfies a relation expressed as $$p = \frac{g}{\sqrt{\sigma(\sigma+2)}}.$$

16. An air conditioner comprising a heat exchange element at a location where the primary air flow and the secondary air flow cross each other, wherein the heat exchange element is the heat exchange element according to claim 1.

17. A heat exchange element, comprising:

unit constituent members arranged in a stacked manner, each unit constituent member is constituted of partition members, each partition member has heat-transfer properties and moisture permeability and spacing members that hold the partition members with a predetermined spacing, wherein the unit constituent members are configured so that a primary air flow passes along upper-surface sides of the partition members and a secondary air flow passes through on under-surface sides of the partition members, and the primary air flow and the secondary air flow cross and exchange heat and moisture via the partition members, wherein the spacing member comprises:

first spacing ribs provided on the upper surface of the partition member with a predetermined spacing parallel to a direction of the primary air flow;

second spacing ribs provided on the undersurface of the partition member with a predetermined spacing parallel to a direction of the secondary air flow;

first deflection-suppressing ribs connected to the second spacing ribs, and provided between the first spacing ribs parallel to each other with a predetermined spacing, and have a height smaller than the first spacing ribs; and second deflection-suppressing ribs connected to the first spacing ribs, and provided between the second spacing ribs parallel to each other with a predetermined spacing, and have a height smaller than the second spacing ribs;

first sealing ribs provided on both sides of upper surface of the partition member, being parallel to a direction of the primary air flow; and second sealing ribs provided on both sides of undersurface of the partition member, being parallel to a direction of the secondary air flow, wherein the first spacing ribs are connected to the second sealing ribs, provided between the first sealing ribs, and parallel to the first sealing ribs with a predetermined spacing, the second spacing ribs are connected to the first sealing ribs, provided between the second sealing ribs, and parallel to the second sealing ribs with a predetermined spacing, the first deflection-suppressing ribs are connected to the second sealing ribs and provided between the first spacing ribs and parallel to the first spacing ribs with a predetermined spacing, and the second deflection-suppressing ribs are connected to the first sealing ribs and provided between the second spacing ribs and parallel to the second spacing ribs with a predetermined spacing.

* * * * *